United States Patent [19]

Sherwood et al.

[11] Patent Number: 4,591,704
[45] Date of Patent: May 27, 1986

[54] DATA SCRAMBLING SYSTEM AND METHOD

[75] Inventors: Michael D. Sherwood; William T. Gregor, both of Mesa; Kenneth D. Snyder, Phoenix; Saddah El-Kilani, Tempe; Richard W. Roth, Scottsdale, all of Ariz.

[73] Assignee: Engineered Systems, Inc., Tempe, Ariz.

[21] Appl. No.: 486,030

[22] Filed: Apr. 18, 1983

[51] Int. Cl.⁴ .............................................. G06K 5/00
[52] U.S. Cl. .................................. 235/380; 235/381; 235/382; 235/382.5
[58] Field of Search ............. 235/380, 381, 382, 382.5

[56] References Cited

U.S. PATENT DOCUMENTS

| | | |
|---|---|---|
| 3,350,800 | 11/1967 | Witt . |
| 3,665,162 | 5/1972 | Yamamoto . |
| 3,862,716 | 1/1975 | Black . |
| 3,985,998 | 10/1976 | Crafton . |
| 4,085,313 | 10/1976 | Van Ness . |
| 4,114,140 | 4/1977 | Kubina . |
| 4,232,193 | 11/1980 | Gerard . |
| 4,253,017 | 2/1981 | Whitehead . |
| 4,268,715 | 5/1981 | Atalla ................................... 235/380 |
| 4,296,315 | 10/1981 | Weimer . |
| 4,296,404 | 10/1981 | Sheldon . |
| 4,335,448 | 6/1982 | Van Ness . |
| 4,408,203 | 10/1983 | Campbell ............................ 235/382 |

*Primary Examiner*—Harold I. Pitts
*Attorney, Agent, or Firm*—LaValle D. Ptak

[57] ABSTRACT

Credit cards to be used with automated systems such as vending machines or the like have various identification and other data encoded on them for use with a particular system for which they are intended. To prevent persons familiar with the system operation and the manner of encoding data on such credit cards from developing unauthorized cards which will work in the system, a random number generator is used to produce a mask for relocating the bits of encoded data in a random manner to various locations on the credit card. This mask is stored in a microprocessor memory and is used both in encoding and decoding such cards.

8 Claims, 7 Drawing Figures

DATA SCRAMBLING SYSTEM AND METHOD

BACKGROUND OF THE INVENTION

Automated fuel dispensing systems and semi-automated fuel dispensing systems have been devised to permit unattended or semi-unattended purchases of fuel by authorized customers of such systems. Customers using systems of this type typically include municipalities, large trucking companies, and the like. Frequently only a single customer or a small group of customers uses a given facility. In such a case, fully automatic self-service fuel dispensing systems (requiring no attendents whatsoever) have been developed. In these systems, a credit card or specially prepared document is inserted into a card reader to cause selected data from the card to be transmitted to a remote central computer for verification. In some systems the computer and verification may be locally present at the facility. If the document is verified as an authorized document, the system then permits the withdrawal of fuel under the control of the credit card. The quantity of the fuel withdrawn, the fuel identity, and usually other indicia such as driver identification, customer identification, vehicle identification, etc. are obtained from the card and processed along with the variable information for the specific transaction being completed.

Systems of this type which have been developed and which are assigned to the same assignee as the present application are disclosed in U.S. Pat. No. 4,085,313 to Bradford Van Ness, U.S. Pat. No. 4,114,140 to John Kubina, and U.S. Pat. No. 4,335,448 to Bradford Van Ness. In addition such systems may be used with a remote verification lock-out system of the type disclosed in the patent to James R. Sheldon, U.S. Pat. No. 4,296,404, and further may employ a card reader security system of the type disclosed in the patent to Weimer et al U.S. Pat. No. 4,296,315.

The system of the Sheldon et al patent permits relatively simple changes in the verification logic of the system to readily change the verification status of any particular cards used in the system from a "valid" to a "non-valid" status for various reasons. For example, if the credit card is stolen, the identity of that card must be changed in the verification logic of the system to a "non-valid" so that the card cannot be used to carry out transactions with the system. Other situations arise, such as where a customer falls behind in payments, so that it becomes necessary to prevent that customer from using the system until his account is satisfactorily brought up to date.

The systems mentioned in the foregoing patents have met with widespread acceptance for use with bulk fueling terminals, particularly for customers having relatively large fleets of vehicles requiring large quantities of fuel. Since the credit cards used in the system accurately identify each transaction and further since the amounts of fuel or other items withdrawn by use of the cards are accurately tabulated for each transaction, record keeping and billing is substantially simplified.

It may be possible, however, for unscrupulous persons who have access to a relatively small number of "credit" cards used in any given system, to determine the particular manner of encoding used on such cards and then fabricate cards which may be used to withdraw fuel from the unattended terminals. This is to be contrasted with the situation where a credit card is stolen and the driver and/or vehicle identification of that card is known so that the "non-valid" lockout feature of the system may be utilized to prevent use of that card from that point out in a system. This problem of the creation of an unauthorized card can arise where a fake driver and/or vehicle identity is created with all other aspects of the card, such as customer identificaion, fuel identification, and the like being compatible with the system. In this latter case it is possible that no "lockout" of the unauthorized card would take place. Thus it is desirable to provide some means of protecting against such unauthorized fabrication of fake cards which would work in the system.

A different system, but one in which it is desirable to make it difficult for the user of a "credit card" to alter data in an unauthorized manner is disclosed in the patent to Whitehead U.S. Pat. No. 4,253,017 issued Feb. 24, 1981. This patent is directed to an identification card comprising several laminated layers, at least one of which is capable of being magnetized with rows and columns of magnetic spots having different north/south magnetic orientations. The card itself is used in conjunction with border or customs offices for checking the validity of the card and also the ingress and egress locations and dates of use of such cards. This latter information is accomplished by means of changing the magnetization of "randomly" located spots in the card, other "randomly" located spots of which provide the user identification and other information. The pattern of the spots for each of the different portions of information data are encoded on the card in an intermixed relationship, so that it is difficult for a person to either counterfeit the card or to alter the variable data to provide a counterfeit indication of ingress or egress or the data thereof. By use of a computer at the point of use of the card, with a program identifying which of the different magnetic spot locations relate to the various items of information represented on the card, decoding of the randomly intermixed data can take place to provide the customs officer with a usable output indicia. At the same time, both counterfeiting and misuse of the card is made difficult.

Another area in which credit card control cards are used and in which security features are necessary is in conjunction with automatic cash dispensing machines commonly used by banks and popularly known as "automatic tellers". One such system for providing an additional level of security in its use is described in the patent to Black et al, U.S. Pat. No. 3,862,716 issued Jan. 28, 1975. This patent discloses an automatic teller system in which a single random number is selected for use over an extended period of time to change the account numbers which are read off of the cards by the automatic teller machines to modified count numbers which then are operated upon to provide the personal password number which the customer is supposed to key into the machine. The secrecy coding remains constant for all cards in the system until the bank adopts a different number as a single random number. The user then has to know the password number to key it into the machine in order to make it operate. Every time the password number is changed, the customer or user of the card must be notified of that change.

The patent to Yamamoto et al, U.S. Pat. No. 3,665,162 issued May 23, 1972, also discloses a bank card system using a card plus a user-entered "secret" number. To this extent the system disclosed in the Yamamoto patent is similar to the system of the Black patent. Yamamoto uses a scrambled number system, but the scrambling is in a converter rather than on the card itself.

It is desirable to provide a system which can wholly defeat or at least make it nearly impossible for anyone to produce a counterfeit card which would work with any of the systems of the foregoing types. To be most effective, such a system or technique for encoding a card should effect the encoding and the subsequent use of the card without requiring any knowledge or additional input from the card user. At the same time in the original encoding of the card also should be capable of accomplishment without any change in the procedure normally used to encode such a card in a conventional fashion. All of the scrambling or masking of data should be effected automatically without the intervention of either the user or the person originally encoding the card for its subsequent use. In addition, any security system used with the card to effect a scrambling of the data bits encoded on it should be such as to accomplish the scrambling of the information in a manner which prevents a would-be counterfeiter from determining the scrambling pattern or code from credit cards used with the system.

SUMMARY OF THE INVENTION

Accordingly, it is an object of this invention to improve the security of unattended dispensing systems.

It is another object of this invention to provide encoding of a credit card used in unattended dispensing systems in a manner which prevents fraudulent fabrication of cards which will work in such dispensing systems.

It is an additional object of this invention to provide an improved security encoding of credit cards used with dispensing systems in which the data bits of the information encoded on the card are scrambled.

It is a further object of this invention to provide an improved simple security encoding of the data encoded on credit cards for use with automatic card actuated dispensing apparatus.

In accordance with a preferred embodiment of this invention, credit cards for use in unattended vending machines or the like are encoded by entering data to be encoded thereon in a conventional manner. The entered data, however, is scrambled by transposing bit locations of the bits of data entered by the data entering device in accordance with a predetermined pattern of transposed bit locations. A standard system card reader then is used to read the scrambled data from the card. The output of the card reader then is supplied to circuit means having a decoding mask in it corresponding to the predetermined pattern of transposed bit locations. This pattern is then used in conjunction with the entered data to produce an output of the decoded information for utilization by the vending machine in a standard manner.

Neither the card user nor the operator originally entering information to be encoded on the card needs to have any knowledge of the scrambling mask which is used to transpose the bits of information which are ultimately actually encoded on the card. Typically, the scrambling information is the result of a software mask. This mask is stored in a memory of the computer or microprocessor used to encode the card originally and used at the vending machine or the like to decode the information read from the card to effect the desired operation of the vending machine.

DETAILED DESCRIPTION

Figure 1:
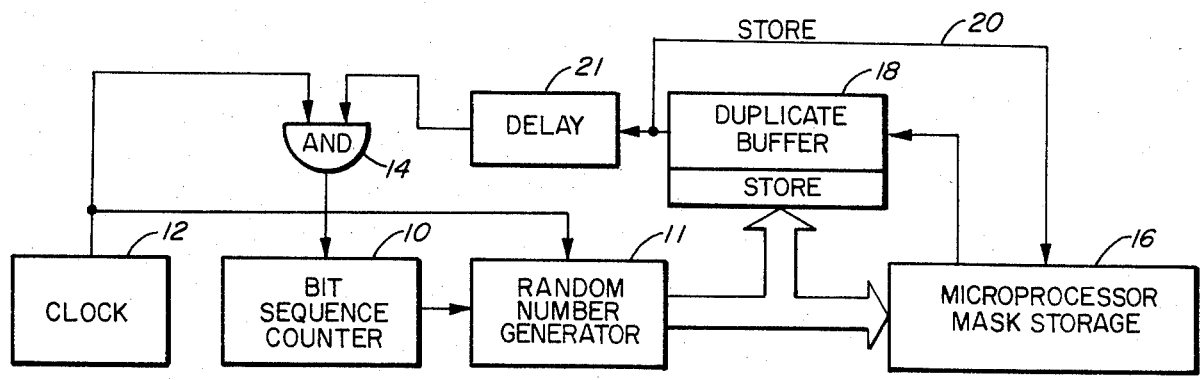
FIG. 1 is a block diagram of a system for establishing a bit transposition pattern for use in encoding printed cards in accordance with a preferred embodiment of the invention.

Reference now should be made to the drawings in which the same or similar reference numbers are used throughout the different figures to designate the same or similar components. FIG. 1 illustrates a block diagram of a system which may be used to scramble the bit locations normally used with a credit card in a remote unattended product dispensing system to relocate the bits identifying various data encoded on the card to randomly selected locations. For example, the credit cards which are illustrated in FIGS. 4, 5, 6 and 7, as typical cards with which the system may be employed, have 80 bit locations. Each of these different bit locations are grouped with other bits to form characters. In the encoding system which is used in the cards of FIGS. 4 through 7, the characters are four bit characters, but the system clearly can be used with characters having a lessor number of bits per character or a greater number. Each of the characters further are grouped together in subgroups of characters for providing a variety of fixed and variable single or multiple character groups used for different purposes such as customer number, terminal identity, driver number, or the like.

To initiate the scrambling of the bit locations from the locations which are ordinarily used with cards in system of the type disclosed in the above mentioned Van Ness and Kubina patents, a bit sequence counter 10 is provided to provide a step-by-step number sequence from number "1" to number "80" indicative of the conventional number pattern for the bit locations of the individual bits of data for the credit cards shown in FIGS. 4 through 7. In any system, these bit locations are preassigned and remain constant throughout the use of the system. The output of the bit sequence counter 10 is applied to a random number generator 11 which may be of a conventional type. Clock pulses for operating both the bit sequence counter 10 and the random number generator 11 are obtained from a conventional clock 12. The pulses for the random number generator 11 are supplied directly from the clock 12, and those for the bit sequence counter 10 are supplied through a normally enabled AND gate 14 to the bit sequence counter 10.

For the system disclosed, the random number generator 11 operates in conjunction with a microprocessor mask storage 16 having four binary encoded masks, namely "1", "2", "4", and "8". These are binary weighted masks and each accommodate twenty characters or numbers for a total of eighty corresponding to the eighty specific bit locations which are to be encoded on the credit cards used with the system.

The bit sequence counter 10 simply counts in sequence under the control of clock pulses applied to it for a total count of eighty applied to the input of the random number generator 11. The random number generator 11 operates at a much higher rate to continuously cycle through the twenty different numbers or characters it is capable of generating to produce the twenty different characters for each of the four microprocessor mask numbers. These characters are applied in parallel to the microprocessor mask storage 16 and to a duplicate buffer store cirucuit 18. Since the numbers generated by the random number generator 11 are random, it is possible for duplication of numbers within each of the different masks to occur. Thus the mask identification and the random number generated by the generator 11 are applied to the duplicate buffer 18. If that number for that mask location previously has not been supplied from the random number generator 11, a "store" output signal is applied over a lead 20 to the microprocessor mask storage to store that number for that mask location in the mask.

At the same time, the output applied over the store line 0 continues to be applied through a delay circuit 21 to the enabling input of the AND gate 14 to permit clock pulses to advance the bit sequence counter 10. If the duplicate buffer store circuit 18 detects a duplication of a previously utilized random number for a particular mask, the store enable signal 20 is removed; and that number is not stored a second time. In addition, the enabling input to the AND gate 14 is removed after passing through the delay circuit 21; so that no clock pulse is applied to the bit sequence counter 10 to advance it. The random number generator 11, however, does receive the next clock pulse to generate in next or new random number for that same bit from the bit sequence counter 10, since that counter was not advanced under this condition of operation. If this new random number does not find a duplicate already stored in the buffer storage circuit 18, the store line 20 is enabled and the new number is stored for that bit in the microprocessor mask storage circuit 16. The AND gate 14 then is enabled and clock pulses from the clock pulse generator 12 continue to pass through the gate 14 to advance the bit sequence counter 10 to its next bit.

The system encoding for transposing the bit locations from the conventional locations identified by the bit sequence counter 10 to the new randomly selected locations, as finally stored in the microprocessor mask storage circuit 16 is accomplished by the following operation on each of the twenty different characters or numbers for each of the four different masks. The character generated by the random number generator 11 for the mask "1" is transposed to a new location which is four times the number generated by the number generator 11 minus three. For the characters corresponding to the mask "2" the new number location or bit location is four times the character generated by the random number generator 11 minus two. For the "4" mask the new location is four times the number generated by the random number generator 11 minus one; and for the mask "8" the number is four times the number generated by the random number generator without any subtraction. By working this arithmetic, which is done automatically by means of a standard microprocessor of the type identified in the above Van Ness and Kubina applications, all of the bits, one through eighty in the conventional sequence are transposed to new readily identifiable randomly selected locations. For an understanding of the manner in which this occurs by the random generation of characters by the random number generator 11 coupled with the random use of each of the four different masks (up to a maximum of twenty times for each mask), a typical transposition sequence for the first ten bits (out of the total of eighty) for a system as actually used is shown in the chart below:

| ORIG LOCATION | TRANSPOSED TO LOCATION | RANDOM CHARACTER | MASK |
| --- | --- | --- | --- |
| 1 | 58 | 15 | 2 |
| 2 | 78 | 20 | 2 |
| 3 | 48 | 12 | 8 |
| 4 | 63 | 16 | 4 |
| 5 | 68 | 17 | 8 |
| 6 | 80 | 20 | 8 |
| 7 | 49 | 13 | 1 |
| 8 | 76 | 19 | 8 |
| 9 | 62 | 16 | 2 |
| 10 | 32 | 8 | 8 |

The generation of new locations or transposed locations for each of the other seventy bits of the sequence of eighty bits is accomplished in a manner similar to that which is illustrated above. This total number of eighty transposed bit locations then is stored as a mask format in the microprocessor memory used for the system with which that particular mask format is used. Usually a particular mask format is used with a single customer or group of customers or group of drivers or some other commonly associated group. If a single customer uses the facilities of a terminal, that customer's mask format is used at that terminal. If a group of customers uses a single terminal, the same mask format is used for all customers using that particular terminal. A mask format which is capable of utilization in a particular terminal or common group of terminals cannot be used with dispensing terminals which are outside of that group and which use a different encoding mask format.

Figure 4:
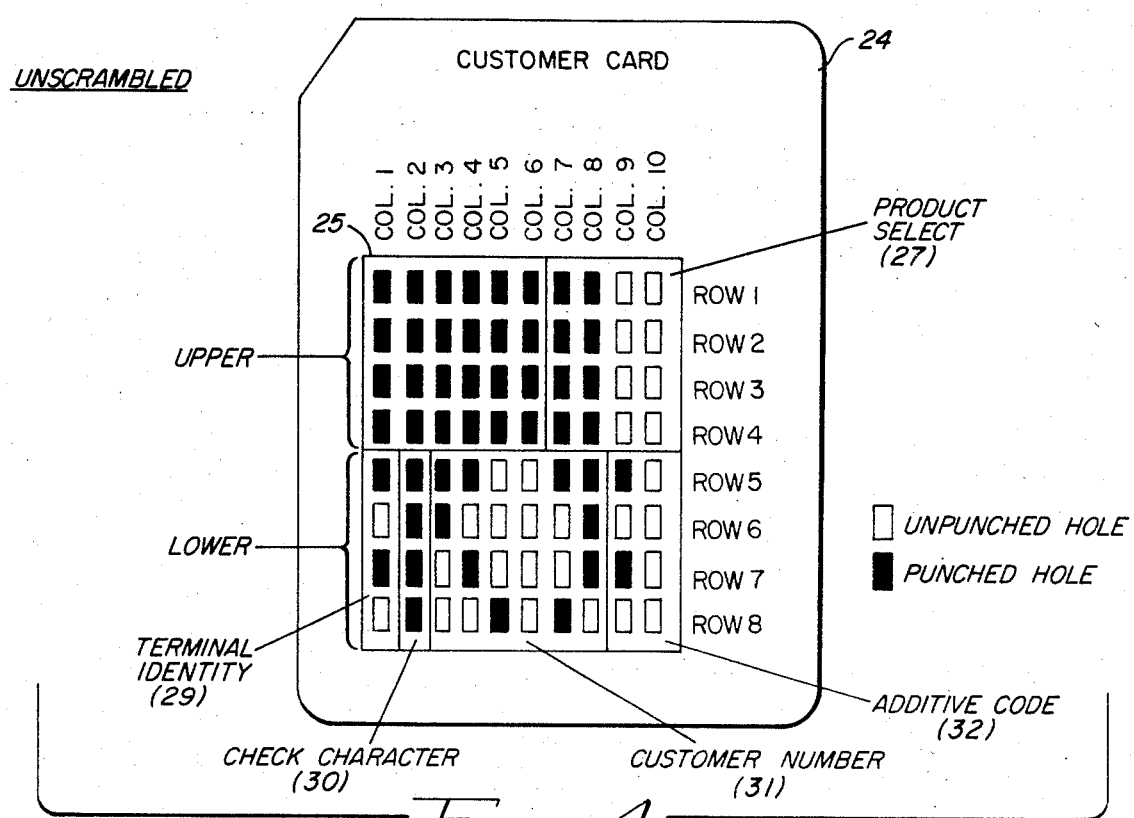
FIGS. 4 and 5 are enlarged representations of conventional, unscrambled, encoding typically used with credit cards in conjunction with an unattended vending machine or dispensing system.
Figure 5:
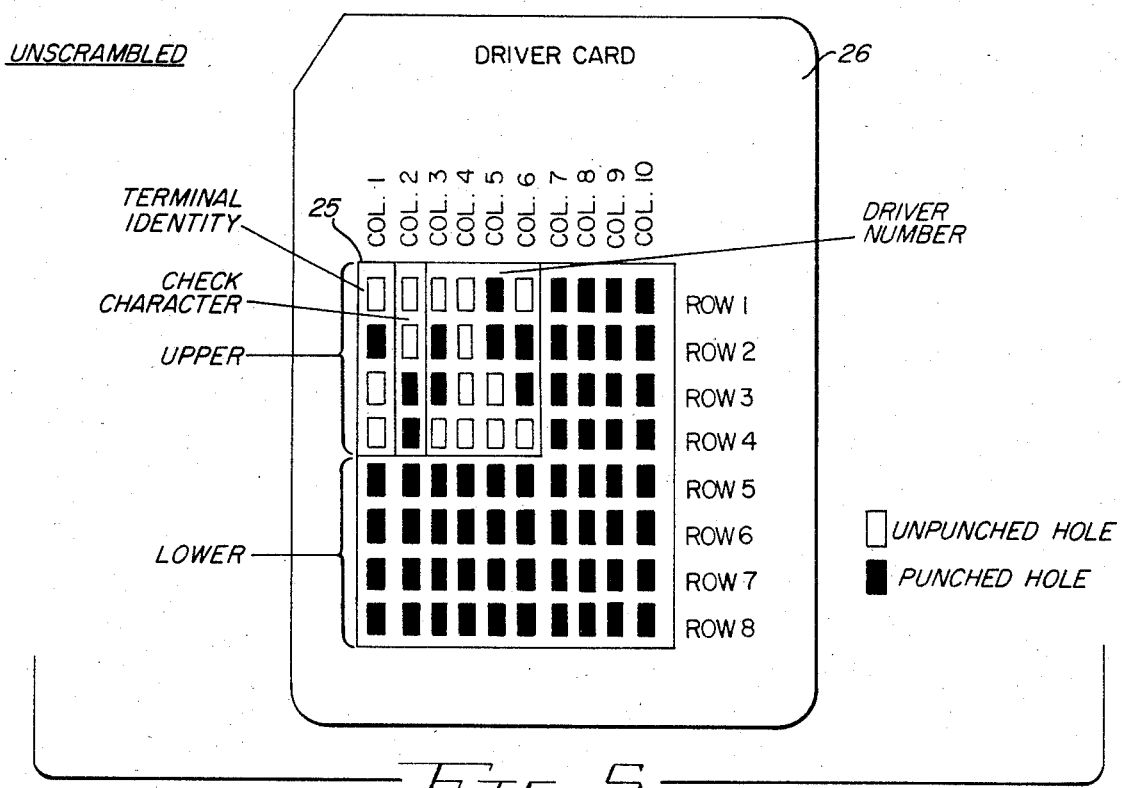

Reference now should be made to FIGS. 4 and 5 which show a typical card set of the type commonly used with fuel dispensing terminals of the type disclosed in the above mentioned Van Ness and Kubina patents. All of the data which is encoded on the two cards illustrated in FIGS. 4 and 5 could be encoded on a single card; but for purposes not important to an understanding of the present invention, two different cards are utilized and are presented to the card reader in an overlying relationship to perform a single transaction.

As illustrated in FIGS. 4 and 5, the card 24 of FIG. 4 is a "customer card". The data on this customer card 24 is encoded in a matrix of ten columns and eight rows. The upper four rows constitute one group of four-bit characters moving across the ten columns, and the lower four rows (rows 5 through 8) constitutes another group of four-bit characters in each of the different columns. In the standard system used prior to the present invention, the upper group of rows, one through four, for columns one through six all are encoded with a punched hole (binary "1"). This area 25 of the card 24 is reserved for utilization for driver identification and is accomplished by the driver card 26 shown in FIG. 5. The remainder of the card 24, however, is divided into subgroups, all of which are identified by legend to indicate the typical information encoded thereon.

These different areas, encoded with a typical pattern of four-bit binary characters include a product select area which is encoded in four characters of the upper four rows in columns 7 through 10. All of the remaining information on the customer card 24 is encoded in the lower section (rows 5 through 8) and includes a terminal identity character 29 in column 1; a check character 30 in column 2; a six character customer number 31 in columns 3 through 8, and a two character additive code area 32 in columns 9 and 10. The designations of the information encoded in these various areas is readily apparent. The product select area 27 identifies various products such as regular gasoline, diesel fuel, kerosene, and the like. The terminal identity 29 is a code which permits this card to be used with a single terminal or group of terminals identified by that code only and prevents use of the card in terminals which are not authorized for that particular customer. The check character 30 is based upon the total number of binary bits (and possible customer mask format identification number or the like) as a validity check character. The customer number identifies a specific customer to distinguish that customer from others which may use the same system and central billing terminal. The additive code 32 identifies items such as oil, transmission fluid, brake fluid, or the like which are capable of being dispensed by the system under control of the customer card.

As mentioned above, a driver card is used in conjunction with the customer card and overlies the customer card 24 for the specific system under consideration. For those areas which are uniquely encoded on the customer card, corresponding areas on the driver card 26 all have a punched hole through them. Thus, the only area of the driver card 26 in a conventional system, illustrated by the two cards of FIGS. 4 and 5, which has any variable data encoded in it is in rows 1 through 4, columns 1 through 6. This is the area 25 shown in FIG. 5 and includes the driver number, a second number of the terminal identity, and a check character for the information located within this area of the card.

Obviously, all of this information could be encoded on a single card for some system. It is encoded on two different cards for an actual commercial system which is which is presently in widespread use. For that reason it has been shown as encoded on the two cards in FIGS. 4 and 5. When the cards are presented to a card reader, they are placed one on top of the other, and the holes in the rows and columns overly one another for a presentaion of the total pattern of information to be read by a card reader at the desired location.

Typically, in a standard system, the customer card and driver cards are encoded for use with the system by entering the data from a keyboard or other suitable device in a conventional fashion. The data then is converted in a bit drive generator and supplied to a card punch which encodes the card in the manner shown in FIGS. 4 and 5. It may be possible, however, for persons familiar with the manner in which the data is arranged on the cards (as indicated above for FIGS. 4 and 5) to produce counterfeit cards which will work with the system. Depending upon the type of terminal, fake customers or fake driver identifications can be encoded which will not be recognized as invalid by the validity checking equipment at the terminal and which therefore can be used to withdraw products from the system. The fraudulent card would only be discovered, if at all, at the time final billing or other record entry was made of data at some subsequent time. To prevent this, the system of the present invention utilizing the random bit relocation or scrambling techniques described in conjunction with FIG. 1 is employed to encode the customer cards and driver cards with scrambled data. This is done in accordance with the transposed bit locations stored in the microprocessor mask format storage 16 after generation of the new random locations for each of the bits by means of the circuit shown in FIG. 1. The manner in which this is done for the cards shown in FIGS. 4 and 5 is illustrated in the "scrambled" encoding of the same data for a typical system on the cards 24' and 26' shown in FIGS. 6 and 7.

Figure 6:
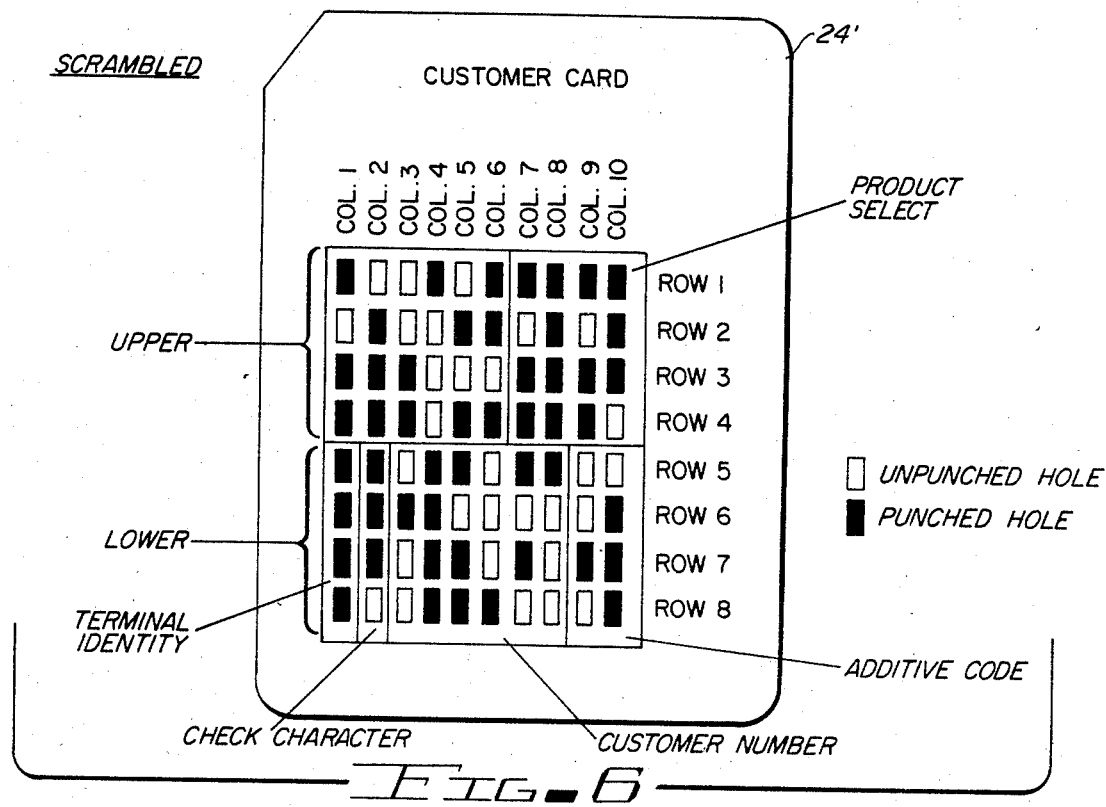
FIGS. 6 and 7 are respresentations of the same cards shown in FIGS. 4 and 5 respectively but with the data encoded thereon scrambled in accordance with the processes described in conjunction with FIGS. 2 and 3.
Figure 7:
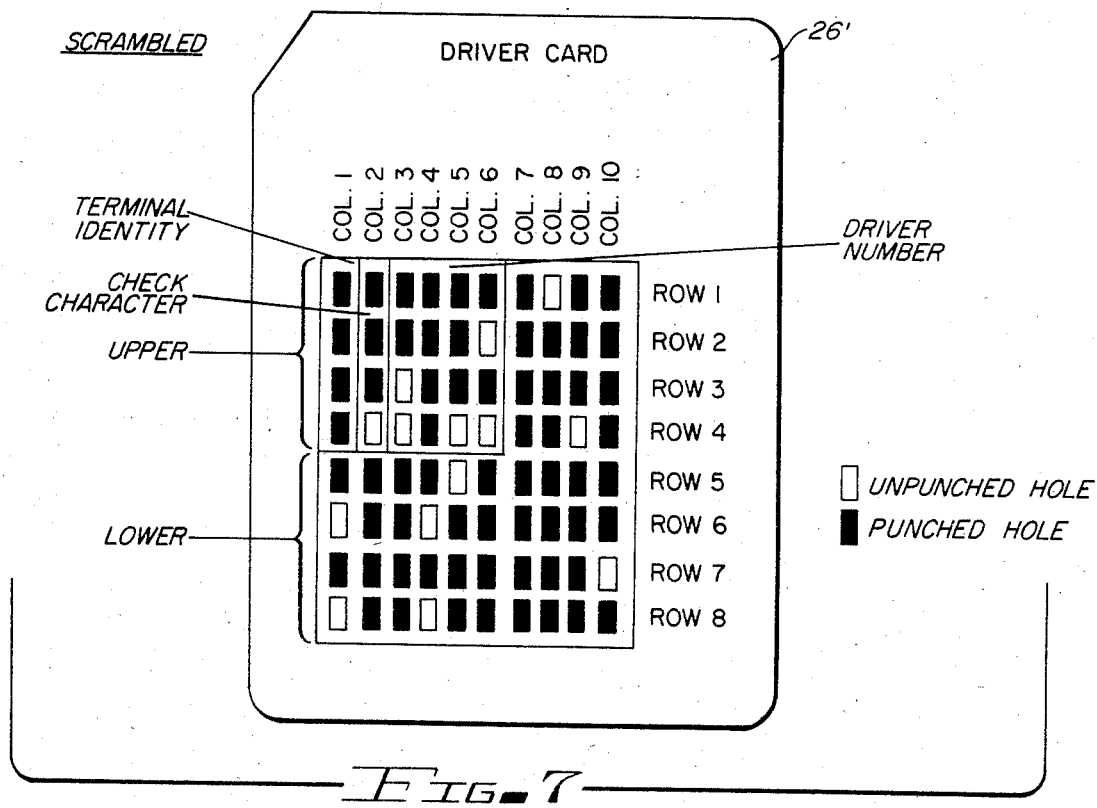

As is apparent from a consideration of the discussion of the system of FIG. 1, any one of the 80 bit locations on both of the cards 24' and 26' can be transposed to any one of the other of the 80 possible locations on each of these cards. Thus, as is seen from a comparison of the cards of FIGS. 6 and 7 with those of FIGS. 4 and 5, no longer are there any fixed areas on either of the cards 24' and 26' which always have punched holes through them. Both cards are completely and totally randomly encoded. Since the data carried by each card is identical with that on the corresponding conventional cards of FIGS. 4 and 5, however, the card of FIG. 7 has more punched holes in it than does the one of FIG. 6 simply because the card of FIG. 5 has more punched holes in it than does the card of FIG. 4. The number of binary "1's" and "0's" are identical on cards 4 and 6 and on cards 5 and 7. In FIGS. 6 and 7, different areas of the cards 24' and 26' are marked with the same designations as used with the unscrambled cards 24 and 26 of FIGS. 4 and 5. These designations, however, have no meaning whatsoever for cards 24' and 26', but are used to facilitate comparison with cards 24 and 26 of FIGS. 4 and 5.

Figure 2:
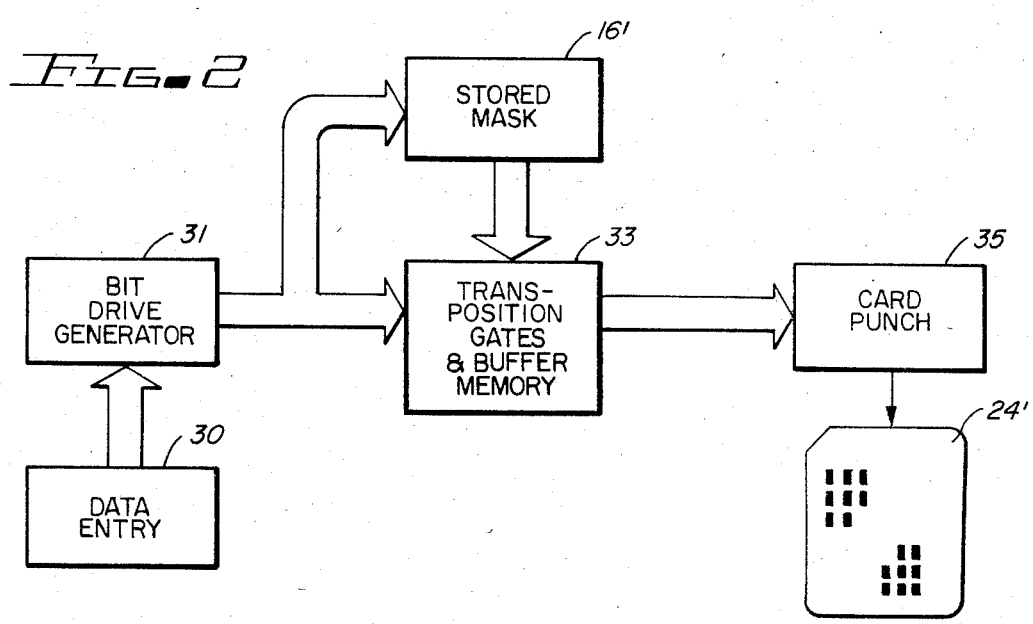
FIG. 2 is a block diagram of a system used to encode credit cards used in accordance with a preferred embodiment of the invention.

To accomplish the transposition in the original encoding of the cards 24' and 26', the standard system for encoding the cards has been modified to shift the bit locations in accordance with the transposed locations originally established in the microprocessor mask storage 16 in the system of FIG. 1. This is illustrated in FIG. 2. The data to be entered is entered by a data entry unit or system 30 in a conventional manner. As stated above, this typically is by means of a keyboard 30 (FIG. 3) which is similar to a typewriter or a calculator keyboard. The operator operating the keyboard 30 has no awareness whatsoever that there is anything different in the entry of data with this system as opposed to the conventional system previously employed. The data entered by the data entry unit 30 is applied to a bit drive generator 31 which normally produces a four bit parallel output directly to a card punch 35 for encoding the data on a typical card shown in FIG. 3 as being the card 24', by way of example. Instead of using this conventional interconnection between the bit drive generator 31 and the card punch 35, however, the output of the bit drive generator 31 is supplied to a transposition gate and buffer memory circuit 33 and to a stored format mask 16' (which may be either in the form of hardware or software controlled memory in a microprocessor).

Because any one of the bit locations can be transposed to any other bit location out of the total 80 locations, it is necessary to store the entire number of bits for all of the characters for the card being encoded before operating the card punch 35. Thus, each of the bits of each of the characters as they are entered by the data entry unit 30 are transposed to a specific new bit location as determined by the mask format in the stored mask unit 16' through the transposition gates 33 and are stored in the buffer memory of the gate and memory section 33. Upon completion of entry of all of the information, the card punch 35 is activated to encode the credit card in accordance with the scrambled information illustrated in FIGS. 6 and 7.

Figure 3:
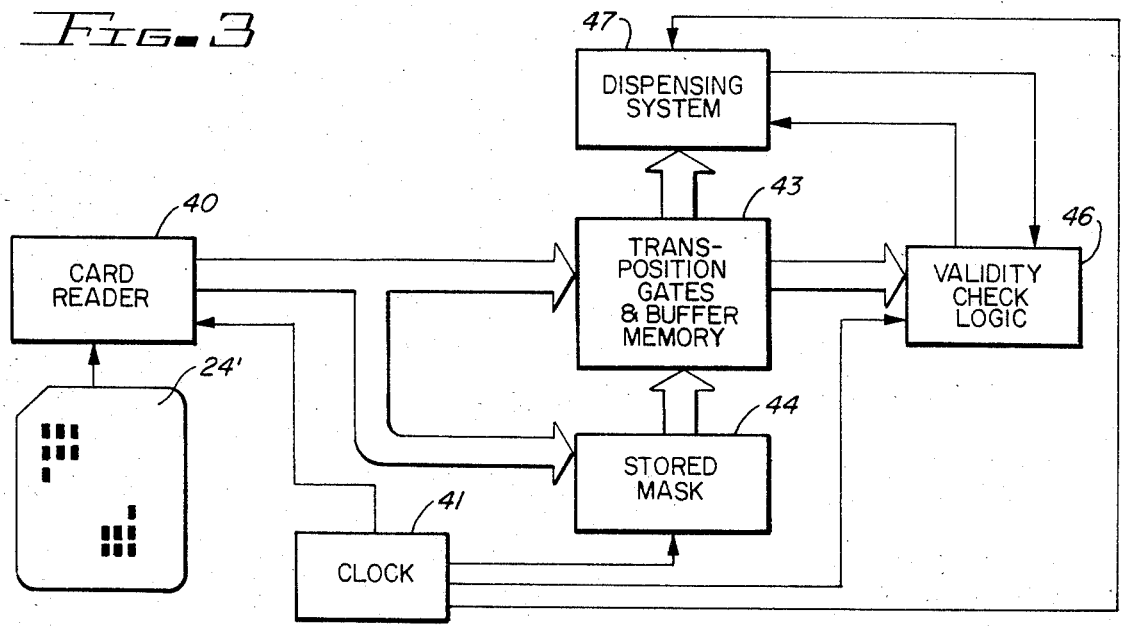
FIG. 3 is a block diagram of a portion of a system utilizing encoded cards for decoding the data stored thereon for use in a dispensing system.

FIG. 3 is a block diagram of a portion of a system of the type disclosed in the aforementioned Van Ness and Kubina patents for utilizing a card 24' or 26' to operate a dispensing system to obtain products and insert the various data which is described in detail in those patents. Since the system with which the card is used is the same as the systems disclosed in those patents, with the exception of a provision for unscrambling or decoding the information on the scrambled cards, the full system has not been shown in detail. Reference should be made to the Kubina or Van Ness patents for the details of the standard system which has been modified in accordance with the present disclosure to handle cards with scrambled data encoded on them.

The cards 24' and 26' are inserted into a card reader 40 of the type disclosed in the aforementioned patents and are read in a conventional manner. A clock 41 provides the operating pulses for synchronizing the operation of this card reader 40 along with other circuit components which are illustrated in FIG. 3. In order to function properly within the dispensing systems which are shown in the aformentioned Kubina and Van Ness patents, it is necessary to decode or translate the data from the card reader 40 back into information which may be further processed by those systems. Consequently, a reverse of the transposition gates and buffer memory 33 and the stored mask 16' of FIG. 2 is provided at the dispensing station or terminal for use in conjunction with the card reader and the dispensing system.

Thus, a transposition gate and a buffer memory circuit 43 along with a stored mask unit 44 are employed to decode and restructure the information read from the cards by the card reader 40 back into the original unscrambled format for use by the system. Since the process is essentially a reverse of the one which has been described above in conjunction with FIG. 2, it is necessary for the transposition gate and buffer memory circuit 43 to receive all of the data from the card reader 40. This data then is rearranged into the original unscrambled format under control of the stored format mask 44. Upon receipt of all of the data from the cards 24' and 26' by the card reader 40, the information then is released by the transposition gate and memory circuit 43 under control of the clock 41 to be processed by the system in conventional fashion. As described previously in conjunction with the Van Ness and Kubina patents, a validity check logic circuit 46 is employed to determine whether to allow the presented cards to operate the system or to "lock-out" the cards from use in the system. If the validity check logic 46 determines that a card is a valid one, the dispensing system 47 is enabled for use in conjunction with the data presented to it by the transposition gate and buffer memory circuit 43. From this point out, the system operates in the same manner as disclosed in the Kubina and Van Ness patents, identified above.

Although the foregoing description of the system has been made in conjunction with credit cards or encoded cards specifically utilized in a fuel dispensing system, it is apparent that the system also may be employed in conjunction with other vending machines, bank teller machines or the like. Furthermore, as already mentioned, a dual card system of the type which is specifically shown in FIGS. 4 through 7 and which has been described above is not necessary. A single card having its data scrambled in accordance with the same techniques described above may be used as well as two cards. In addition, multiple cards may be used in greater numbers than two, and it is not necessary to simultaneously insert the cards into the reader to take advantage of the teachings of this invention. Various types of systems operated in a variety of different ways may be modified in accordance with the techniques disclosed and described here without departing from the true scope of the invention.

I claim:

1. A system for encoding a credit card or the like for use in a vending machine or the like in a manner to prevent fraudulent fabrication of cards which will work in such vending machine, and in which a predetermined number of identifiable bit locations are used for encoding such data, said system for encoding such credit cards including in combination:

means for entering data to be encoded on a credit card according to a known standard pattern of bit locations for such data;

means for transposing said bit locations of said bits of data into new locations according to a predetermined stored pattern;

means coupled with said data entering means and said transposing means for scrambling and transposing said bits of data to said new bit locations; and marking means coupled with the output of said transposing means for entering encoded data on said credit cards in accordance with said predetermined stored pattern of transposed bit locations.

2. The combination according to claim 1 wherein said transposing means includes a buffer storage means connected between said data entering means and said marking means, said buffer memory means having a capacity sufficient to receive all of the data to be encoded on a credit card prior to supplying said transposed data to said marking means from said transposing means.

3. The combination according to claim 2 wherein said marking means comprises a card punch and wherein said data is binary data, each bit of which is identified by either the presence or absence of a hole punched in a corresponding bit location on said credit card.

4. The combination according to claim 3 wherein said predetermined pattern of transposed bit locations is stored in a microprocessor memory and initially is generated by a random number generator so that no knowledge of the transposition pattern is available to or required by persons entering data in said data entering means.

5. The combination according to claim 1 wherein said marking means comprises a card punch and wherein said data is binary data, each bit of which is identified by either the presence or absence of a hole punched in a corresponding bit location on said credit card.

6. The combination according to claim 1 wherein said predetermined pattern of transposed bit locations is stored in a microprocessor memory and initially is generated by a random number generator so that no knowledge of the transposition pattern is available to or required by persons entering data in said data entering means.

7. A system for reading information from and utilizing such information encoded on a credit card or the like for use in a vending machine or the like in a manner to prevent fraudulent fabrication of cards which will work in such vending machines wherein the data bits of words encoded on such cards is encoded with the bit locations thereon scrambled and dispersed throughout the total available number of bit locations in accordance with a predetermined pattern of transposed bit locations, said system including in combination;

a card reader;

means coupled with the output of said card reader including transposition gate means and means for storing information corresponding to said predetermined pattern of transposed bit locations for producing an output of unscrambled decoded information for utilization in accordance with such information; and utilization means coupled with the output of said transposition gate means for utilizing the decoded information.

8. The combination according to claim 7 wherein said information is stored in the form of binary data bits and wherein said buffer memory means comprise a transposition mask stored in a microprocessor memory to operate said transposition gate means to relocate said transposed bits of data to a predetermined decoded conventional format for utilization by said utilization means.

* * * * *